United States Patent [19]
Hancock et al.

[11] Patent Number: 5,428,732
[45] Date of Patent: Jun. 27, 1995

[54] PLAYLIST MECHANISM FOR SPECIFICATION OF COMPLEX MEMORY OBJECTS

[75] Inventors: Steven M. Hancock, Boca Raton; Martin J. Paulat, Jr., Delray Beach; John E. Parsons, Jr., Boca Raton, all of Fla.

[73] Assignee: International Business Machines Corporation, Armonk, N.Y.

[21] Appl. No.: 303,548

[22] Filed: Sep. 9, 1994

Related U.S. Application Data

[63] Continuation of Ser. No. 815,473, Dec. 31, 1991, abandoned.

[51] Int. Cl.⁶ .............................................. G09B 19/04
[52] U.S. Cl. .................................................... 395/154
[58] Field of Search ............... 395/145, 147, 152, 154, 395/161

[56] References Cited

U.S. PATENT DOCUMENTS

| | | | |
|---|---|---|---|
| 4,641,253 | 2/1987 | Mastran | 395/154 |
| 4,884,972 | 12/1989 | Gasper | 395/154 X |
| 5,111,409 | 5/1992 | Gasper et al. | 395/154 X |
| 5,148,154 | 9/1992 | Mackay et al. | 395/154 X |

Primary Examiner—Heather R. Herndon
Assistant Examiner—Cliff Nguyen Vo
Attorney, Agent, or Firm—Bernard D. Bogdon

[57] ABSTRACT

Multimedia data objects in memory need not be processed serially from beginning to end but may instead be defined as algorithmically generated data streams. This functionality is provided through an architected application programming interface with a mechanism for defining a method of composing a complex object from smaller objects, for defining a behavior for the complex object, and for allowing that behavior to be varied based on external events.

9 Claims, 5 Drawing Sheets

| INSTRUCTION #1 | OPCODE | OPERAND 1 | OPERAND2 | OPERAND 3 |
|---|---|---|---|---|
| INSTRUCTION #2 | OPCODE | OPERAND 1 | OPERAND2 | OPERAND 3 |
| INSTRUCTION #3 | OPCODE | OPERAND 1 | OPERAND2 | OPERAND 3 |
| ⋮ | ⋮ | ⋮ | ⋮ | ⋮ |

FIG. 1A

| OPCODE | OPERATION | OPERAND 1 | OPERAND 2 | OPERAND 3 |
|---|---|---|---|---|
| 0 | DATA | POINTER TO BUFFER | BUFFER LENGTH | CURRENT POSITION |
| 1 | BRANCH | IGNORED | TARGET | IGNORED |
| 2 | LOOP | COUNT | TARGET | CURRENT ITERATION |
| 3 | CALL | IGNORED | TARGET | IGNORED |
| 4 | RETURN | IGNORED | IGNORED | IGNORED |
| 5 | EXIT | IGNORED | IGNORED | IGNORED |
| 6 | NOP | IGNORED | IGNORED | IGNORED |
| 7 | MESSAGE | IGNORED | MESSAGEPARM | IGNORED |
| 8 | CUEPOINT | USERPARM, 0 | TIME | IGNORED |

| | | p CLIP | CLIP LENGTH | 0 |
|---|---|---|---|---|
| 0 | DATA | p CLIP | CLIP LENGTH | 0 |
| 1 | DATA | p CLOP | CLOP LENGTH | 0 |
| 2 | BRANCH | 0 | 0 | 0 |
| 3 | DATA | p WHOA | WHOA LENGTH | 0 |
| 4 | DATA | p BOY | BOY LENGTH | 0 |
| 5 | EXIT | 0 | 0 | 0 |

WHAT IS HEARD :

REPEATS CONTINUOUSLY

"CLIP" "CLOP" "WHOA" "BOY"

PROGRAM CHANGES INSTRUCTION #2 INTO A NOP.

PLAYLIST MECHANISM FOR SPECIFICATION OF COMPLEX MEMORY OBJECTS

This is a continuation of application Ser. No. 07/815,473, filed on Dec. 31, 1991, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to multimedia data processing computer systems, and more particularly to a mechanism for specifying audio and video data objects to be asynchronously processed.

2. Description of the Related Art

Multimedia computer systems often deal with digital audio or video data objects that are contained in files, each of which is a named set of records stored and processed as a unit, and which files are recorded or played under control of application software. Application programs may also define these objects in memory, for example, by synthesizing an audio waveform with an algorithm. Once defined in memory, a data object may be played by the multimedia computer under application program control in much the same manner as if it were contained in a file.

The common approach for playing data objects from memory generally involves the application program passing a pointer to the data object to be played. In cases where objects are to be played repeatedly, or are to be played in combination, the application must continuously pass pointers to data buffers through a programming interface. An example is an application program that produces a visual animation of a horse walking, accompanied by a digital audio data stream of the sound of the horse's footsteps. The following code fragment illustrates what is required for the application program to play the representative sounds of the horse's footsteps with two digital audio waveforms of "clip" and "clop" sounds:

```
While (horse is walking)
    send buffer for "clip" sound
    send buffer for "clop" sound
endwhile
```
Note that for the above to be accomplished, the application must call the programming interface continuously, passing pointers to the data buffers.

Some existing programming interface designs provide simple looping constructs whereby data buffers may be played repeatedly. The following code fragment illustrates passing of data buffers to a programming interface that supports looping constructs, to accomplish the previously mentioned audio playback:

```
send begin loop indicator with repeat count
send buffer for "clip" sound
send buffer for "clop" sound
send end loop indicator
```

This approach, however, limits the application program's control over the data stream that is being produced and offers little, if any, interactive operation by the operator. In the case of the application producing the sound of the horse's footsteps, user interaction or some other stimulus may require that the sound be altered at some point after it is initiated, i.e., at run-time. For example, the surface upon which the horse is walking may be varied, changing the sound of the footsteps. Application programs cannot readily specify different buffers to be used once the initial loop of buffers is started using this approach.

One such example of this practice is for graphics display lists, whereby an application program defines a set of graphics drawing instructions to be executed by an asynchronous graphics display list processor. However, these relate to drawing instructions and not to the processing of multimedia data.

SUMMARY OF INVENTION

A data stream definition of a complex media object is accomplished with a memory playlist, and is provided for in the present invention. The memory playlist is a data structure that defines the component objects, as well as the algorithm for combining those objects into a complex media object. The memory playlist program functions cooperatively with an application program in a data processing system such as the OS/2 TM architectural environment. The generation of the data stream by a memory playlist is performed asynchronously to the application execution, where asynchronous refers to a sequence of operations that are executed out of time coincidence with any event so that once a stream is started with a memory playlist, the stream can continue without application intervention. The application program can monitor or synchronize its actions with the generation of the data stream, and can manipulate the algorithm under program control to provide interactivity with the data stream being produced.

An exemplary memory playlist usage is the generation of the sound of footsteps wherein the sound of the left footstep and the sound of the right footstep are recorded separately, and the sampled audio for each step stored as a distinct component data object. A playlist specifying a loop of playing the left footstep and right footstep memory objects repeatedly would result in the sound of "walking" being generated as a composite object.

BRIEF DESCRIPTION OF THE DRAWINGS

FIG. 1A illustrates the format of the playlist structure, according to the principles of the present invention.

FIG. 1B lists the operations performed by playlist instructions, along with their operands, according to the principles of the present invention.

FIG. 5 illustrates application modification of the playlist structure to affect the produced composite data stream, according to the principles of the present invention.

DETAILED DESCRIPTION OF INVENTION

The memory playlist is a data structure that defines the component objects, as well as the algorithm for combining those objects into a complex composite media object or data stream. The memory playlist contains pointers to data objects, as well as control information to enable looping, branching, and subroutines within the playlist. The memory playlist may be modified dynamically at run-time by the application, i.e., while it is being played. This data structure can be specified as a memory object to be processed by a device in the IBM OS/2 Multimedia Presentation Manager/2 ™ (MMPM/2) ™ System. This innovation, although not limited to, is specifically adapted for OS/2 ™ data processing environments.

The memory playlist structure is formulated by the application, and is not intended as a high-level scripting or presentation language. Computer, programming and software terms, and other included designations throughout this specification, are used as commonly intended in their related fields, the general meanings of any of which can be found in IBM's *Dictionary of Computing*. The format of the memory playlist is similar to that of machine instructions. Each instruction in the playlist is of a fixed format, consisting of a 32-bit operation code and three 32-bit operands. The playlist comprises an array of playlist instructions, set forth as in FIG. 1A, wherein each includes an opcode and operands 1, 2 and 3.

Figure 2:
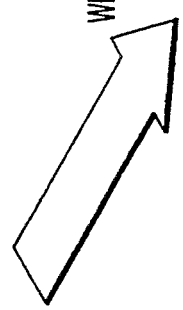
FIG. 2 illustrates exemplary audio buffers combined into a single composite data stream for playback of the illustrative sound, according to the principles of the present invention.

FIG. 1B summarizes the different memory playlist instructions and is descriptive of the operations of each. The operations or instructions include DATA, BRANCH, LOOP, CALL, RETURN, EXIT, NOP, MESSAGE and CUEPOINT. This memory playlist is particularly useful for playing synthesized audio. With the memory playlist, audio objects can be played in succession from one or more memory buffers accessed through the DATA operation. FIG. 2 is an exemplary illustration for playback from, in this case four, multiple memory buffers to achieve the effect of a "talking" clock. An application program would construct the playlist appropriately from a library containing the spoken words for numbers "one" through "fifty-nine" and letters "AM" and "PM". Each memory playlist can be set up to play one data type only, in the IBM OS/2 Multimedia Presentation Manager/2 system implementation. For example, a playlist may be set up to play 16 bit Pulse Code Modulation (PCM) waveforms.

Set forth below in more detail is a description of each of the functions of the playlist instructions set forth in FIG. 1B:

A. DATA: This instruction specifies a data buffer to be played from or recorded into. The first operand is a long pointer to a buffer in the application. The second operand is the buffer length. The third operand is updated by the system during playback or recording and it is the current position within the buffer. For playback, it is the number of bytes that have been sent to the output device handler. During recording, it is the number of bytes that have been placed into the user buffer. The current position of the third operand is important especially when recording. After stopping the record operation, this field will have the number of bytes actually recorded into the data buffer.

B. BRANCH: The BRANCH playlist instruction transfers control to a specified location in the playlist. The second operand specifies the absolute instruction number in the playlist to which control is to be transferred and is identified as target. The first instruction in the playlist is instruction number 0, the second is number 1, and so on. Therefore, a playlist defined as an array of structures (instruction operation and operand values) would have its first instruction referenced as array element index 0. Note that since the operands on the no operation (NOP) instruction are ignored, the application can change the state of a branch to enable or disable it by simply changing the opcode on the playlist instruction.

C. LOOP: The LOOP instruction is used to control iteration in a playlist. Operand 1 contains the number of times the loop is to be executed. Operand 2 contains the target instruction to branch to, in the event the loop condition fails. Operand 3 contains the current iteration of the loop. The last instruction in a loop should be a BRANCH back to the corresponding LOOP instruction.

The operation of the LOOP instruction is as follows:
a) if the current iteration is less than the loop count, control is transferred to the playlist instruction following the LOOP instruction and the current iteration is incremented;
b) otherwise, the current iteration is reset to zero and control is transferred to the instruction specified in operand 2.

Figure 3:
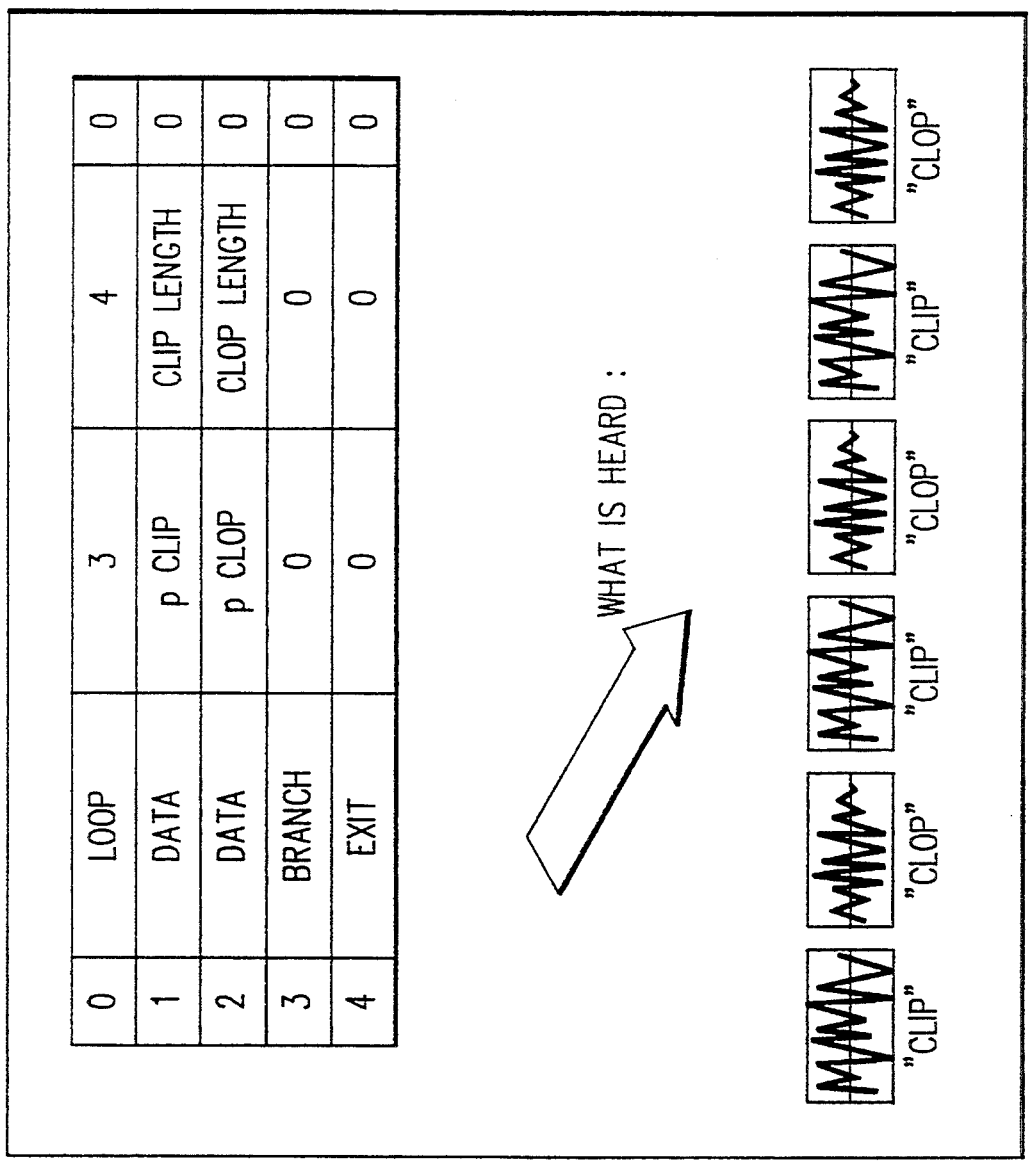
FIG. 3 illustrates looping on data buffers within the playlist processor to achieve repeated audio, according to the principles of the present invention.

FIG. 3 illustrates the use of the LOOP construct and for that example will produce the "clip-clop" sound three times.

D. CALL: The CALL playlist's instruction transfers control to the playlist instruction number specified in the second operand, and saves the instruction number of the instruction following the CALL instruction for use on a RETURN instruction. CALL instructions may be nested up to 20 levels in the MMPM/2 System implementation. Branching out of a subroutine is not prohibited, but it is not recommended since it leaves an unused return address on the stack.

E. RETURN: The RETURN instruction transfers control to the playlist instruction following the most recently executed CALL playlist instruction. The operands are ignored.

F. EXIT: This exit instruction indicates the end (termination) of the playlist execution. The operands are ignored.

G. NOP: (Abbreviation for "no operation.") This instruction can be used as a placeholder. The operands are ignored.

H. MESSAGE: The MESSAGE instruction is used to return a message to the application during playlist processing. The message parameter contained in "messageparm" is returned to the application when the playlist processor interprets the MESSAGE instruction.

I. CUEPOINT: The CUEPOINT instruction causes a cuepoint data record to be entered into the stream. A cuepoint message will be returned to the application when the cuepoint data record is actually consumed from the stream. The CUEPOINT instruction is ignored when used in a recording scenario. The high word of operand 1 specifies a user-defined parameter to be returned on the cuepoint message. Operand 2 specifies an offset (in time units) at which point the actual cuepoint message should be generated.

Note that the exact specification of the playlist data structure is language-dependent. All examples set forth are pseudo-code for the symbolic representation of a fragment of a playlist data structure.

Figure 4:
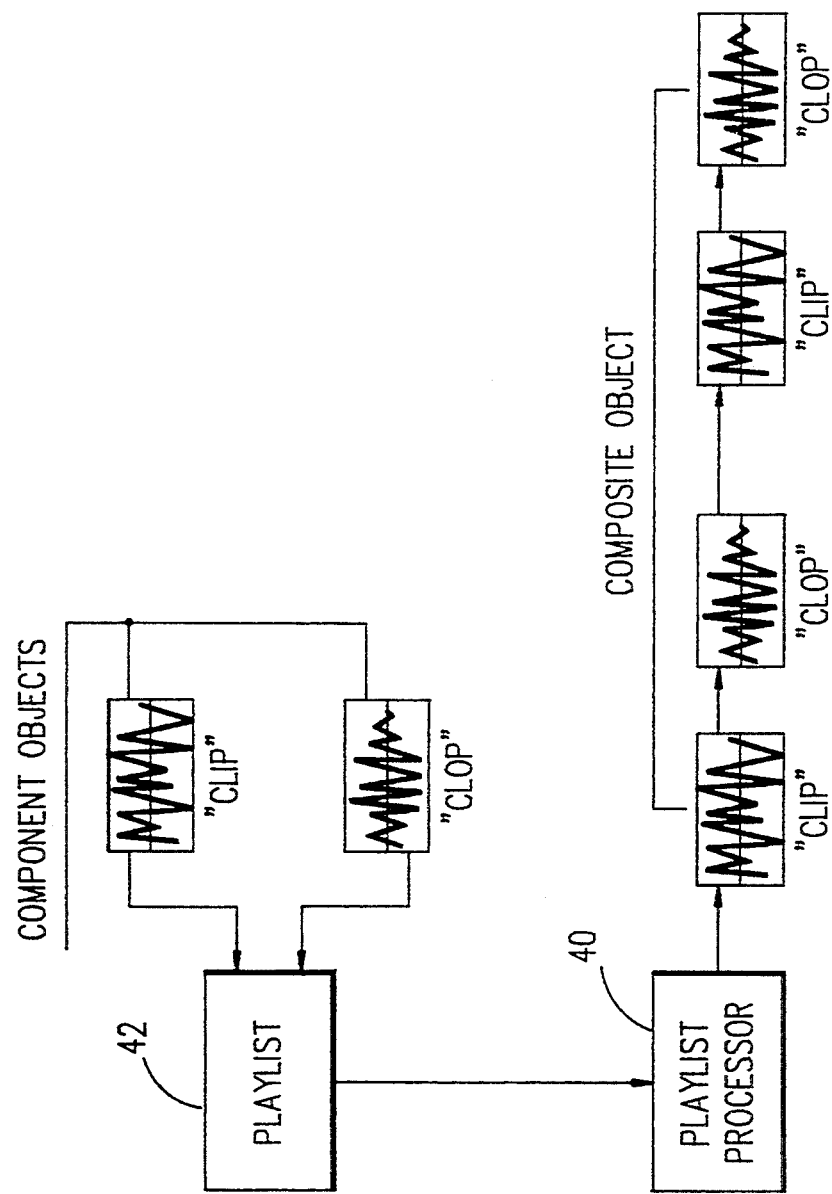
FIG. 4 illustrates component data objects being combined into a composite object by the playlist processor, according to the principles of the present invention.

The memory playlist is a data structure in the application, and the application can modify the playlist to achieve various effects in controlling the memory stream. Since the memory playlist processor 40, as shown in FIG. 4, is asynchronously interpreting the playlist 42 and its playlist instruction, it is prudent to exercise care as the playlist 42 is being modified to avoid erroneous results. In FIG. 4 the two audio component objects of "Clip" and "Clop" are processed by the playlist processor 40 to provide a repeated composite object sound of "Clip" and "Clop," followed by "Clip" and "Clop."

Each playlist instruction is treated as an "atomic" unit or uninterruptible operation. Once an instruction has started, changes to the playlist will not be recognized until the instruction has finished. Also, instructions that update the parameters, as they execute, may overwrite modifications made by the application. For example, if the LOOP iteration count is modified by the application as the LOOP instruction is being executed, the playlist processor may overwrite the application modification with the loop iteration value based on the value when the instruction started execution.

Modification of playlist operation codes (32 bit values) also are accorded an atomic or uninterruptible operation. Changing BRANCH to NOP, NOP to BRANCH, or changing the loop count value of a LOOP instruction are some acceptable techniques to achieve effects with playlists.

FIG. 5 gives an elementary example of playlist modification. An application initiates processing of the Playlist which repeatedly produces a composite "Clip Clop" sound. At an appropriate time, potentially as a result of user interaction, the Branch instruction 2 is modified by the program into a NOP (No Operation) to conclude the audio presentation with the composite "Whoa" and "Boy."

More extensive playlist modifications, particularly DATA instruction pointer/length operands, should be performed with care, as it is possible that the playlist processor 40 will gain control and interpret an instruction that is partially modified, as previously pointed out in the discussion of FIG. 4. In general, it is not good practice to modify DATA instructions unless it is known that the playlist instruction processor 40 will not interpret that instruction, i.e., DATA instructions should not be modified unless they are in a currently unreachable portion of the playlist. The MESSAGE instruction can be used to ascertain the location within the playlist currently being interpreted and if, for example, it is known to be in a loop in the playlist, the application can safely modify playlist instructions outside the loop. Once the DATA instructions have been modified, BRANCH, or NOP instructions can be changed to direct playlist interpretation to the modified section of the playlist.

Applications may include memory playlists for use in recording scenarios. Playlist MESSAGE instructions are useful for notifying the application of the playlist progress, such as completion of filled buffers. Because of the features of the present invention, note that if these buffers are enclosed in a loop that a simple circular buffering scheme is implemented.

Playlist debugging is possible with the MESSAGE instruction being used by the application to trace specific points during the execution of the playlist processor (40).

For playback of objects using a playlist, the following program design language is embodied within the playlist processor 40: The recording scenario is very similar with the exception that the data is received instead of sent and CUEPOINT is the same as a NOP.

The program design language code listed below is specific to this preferred embodiment. However, the present invention is not limited to the specific application as described. For a more general embodiment, references would be replaced by other words representing a different embodiment.

While the invention has been shown and described with reference to particular embodiments thereof, it will be understood by those skilled in the art that various changes in the foregoing and other changes and details may be made therein without departing from the spirit and scope of the invention.

---

Copyright IBM Corporation 1991
Allocate a callstack of callstacksize (20 entries (32 bit value)
Set callstacktop = 0
Set current __pl__entry to 0
While no error
  Copy the application playlist entry (current__pl__entry)
    to playlist processor variable (plentry)
  //now the current entry (instruction) is atomic. Any modifications
  //to the application copy of the entry will not be recognized until
  //the current entry has finished execution
  Switch on (opcode)
    Case DATA:
      //operand 1 is pointer to buffer, op2 = length of buffer, op3 =
      //current position the playlist processor is at within the
      //current
        validate memory pointed to by operand 1 for a length of operand 2
        set applications copy of plentry operand 3 to 0 (current position.
        while there is more data in this buffer to send (plentry.op2>0)
        send some of the data in the buffer
        decrement local plentry.op2 by amount of data sent
        set applications copy of plentry.op3 to total number of bytes sent
        endwhile
        increment current__pl__entry
    Case BRANCH:
      set current__pl__entry to plentry.operand2
    Case LOOP:
      // if iteration < count
      if (plentry.operand3 < plentry.operand1)
      increment plentry.operand3 (iteration)
      increment current__pl__entry
      else
      reset plentry.operand3 to 0 (iteration)
      set current__pl__entry to plentry.operand2 (target)
      set applications plentry.operand3 to local plentry.operand3
    Case CALL:
      if (callstacktop >= callstacksize)
      return PLAYLIST__STACK__OVERFLOW error to application
      stop the playlist processor
      else
      set callstack (callstacktop) = current__p__entry
      +1 (entry to return to)
      increment callstacktop
      set current__pl__entry to plentry.operand2
    Case RETURN:
      if callstacktop = 0

```
                return PLAYLIST_STACK_UNDERFLOW error to
                    application
                stop the playlist processor
            else
                decrement callstacktop
                set current_pl_entry to callstack (callstacktop)
        Case EXIT:
            stop the playlist processor
        Case NOP:
            increment current_pl_entry
        Case MESSAGE:
            increment current_p_entry
            report the message to the application
        Case CUEPOINT:
            send a cuepoint indicator with operand2 and
                operand1 to the data consumer
            increment current_p_entry
        Default case:
            Return INVALID FUNCTION error to application
            stop the playlist processor
    endswitch
endwhile
```

What is claimed is:

1. A multimedia data processing system, comprising:
a system processor, a storage system including a memory unit, at least one multimedia application program stored within the memory unit and operating system for execution by said system processor;
memory means included within said storage system for storing audio and video component data objects;
first means for manipulating video data objects, including the video component data objects, to produce visual animation on a display unit;
second means for manipulating audio data objects, including the audio component data objects, to produce sounds in an audio system;
a playlist processor, under control of the at least one multimedia application program, providing a plurality of playlist constructs for selection by the at least one multimedia application program to process asynchronously of the at least one multimedia application program by interpreting and manipulating the audio and video component data objects independently of other operations of the at least one multimedia application program; and
a playlist instruction processor for processing by interpreting and manipulating the audio and video component data objects in accordance with the plurality of playlist constructs selected by the at least one multimedia application program and provided by the playlist processor to combine the audio and video component data objects to generate composite audio and video data objects asynchronously to the operation and execution of the at least one multimedia application program for manipulating by said first and second means to produce visual animation and sounds on said display unit and audio system, respectively, in accordance with the playlist constructs of the playlist processor.

2. The multimedia data processing system, as defined in claim 1, wherein the playlist processor provides a first playlist construct to transfer the process of interpreting and manipulating the audio and video component data objects to a second playlist construct to further process the audio and video component data objects.

3. The multimedia data processing system, as defined in claim 1, wherein the playlist processor provides a playlist construct for providing a message to the at least one multimedia application program.

4. The multimedia data processing system, as defined in claim 1, wherein the plurality of playlist constructs, provided by the playlist processor, include one or more of the data process states of data selecting, branching, looping, calling, returning, exiting, placeholding, message sending and data record entering.

5. A multimedia data processing system, comprising:
a system processor, a storage system including a memory unit, at least one multimedia application program stored in the memory unit and an operating system for execution by said system processor;
memory means included within said storage system for storing audio component data objects;
audio means for manipulating audio data objects including the audio component data objects to produce sounds in an audio system;
a playlist processor, under control of the at least one multimedia application program, providing a plurality of playlist constructs for selection by the at least one multimedia application program to process asynchronously of the at least one multimedia application program by interpreting and manipulating the audio component data objects independently of other operations of the at least one multimedia application program; and
a playlist instruction processor for processing by interpreting and manipulating the audio component data objects in accordance with the plurality of playlist constructs selected by the at least one multimedia application program and provided by the playlist processor to combine the audio component data objects to generate a composite audio data object asynchronously to the operation and execution of the at least one multimedia application program for manipulating by said audio means to produce sounds on said audio system in accordance with the playlist constructs of the playlist processor.

6. A method of operating a multimedia data processing system comprising a processor, a storage system including a memory unit for storing at least one multimedia application program and an operating system for execution by said processor, comprising the steps of:
storing said at least one multimedia application program in said memory unit of said multimedia data processing system;
storing audio and video component data objects in said storage system of said multimedia data processing system;
executing said at least one multimedia application program to select playlist constructs for selecting, interpreting and manipulating at least two of the audio and video component data objects for combining said at least two audio and video component data objects to form a composite data object of said at least two audio and video component data objects;
selecting, interpreting and manipulating, asynchronously of the executing of the at least one multimedia application program, said at least two of the audio and video component data objects to form the composite data object of said at least two audio and video component data objects; and executing said at least one multimedia application program simultaneously with the steps of selecting, interpreting and manipulating to execute operations independent of the steps of selecting, interpreting and manipulating.

7. The method of operating a multimedia data processing system, as defined in claim 6, wherein the step of executing the at least one multimedia application program to select playlist constructs, includes the step of selecting at least one of a plurality of playlist constructs including data selecting, branching, looping, calling, returning, exiting, placeholding, message sending and data record entering.

8. The method of operating a multimedia data processing system, as defined in claim 6, wherein the at least one multimedia application program executes the step of selecting a playlist construct during run-time of the step of selecting, interpreting and manipulating, asynchronously of the executing of the at least one multimedia application program, to generate a resultant composite data object, combined of at least two audio and video component data objects, modified in accordance with the playlist construct selected during run-time.

9. The method of operating a multimedia data processing system, as defined in claim 8, wherein the step of selecting, interpreting and manipulating is not registered during execution of the step of selecting a playlist construct.

* * * * *